Figure 1:
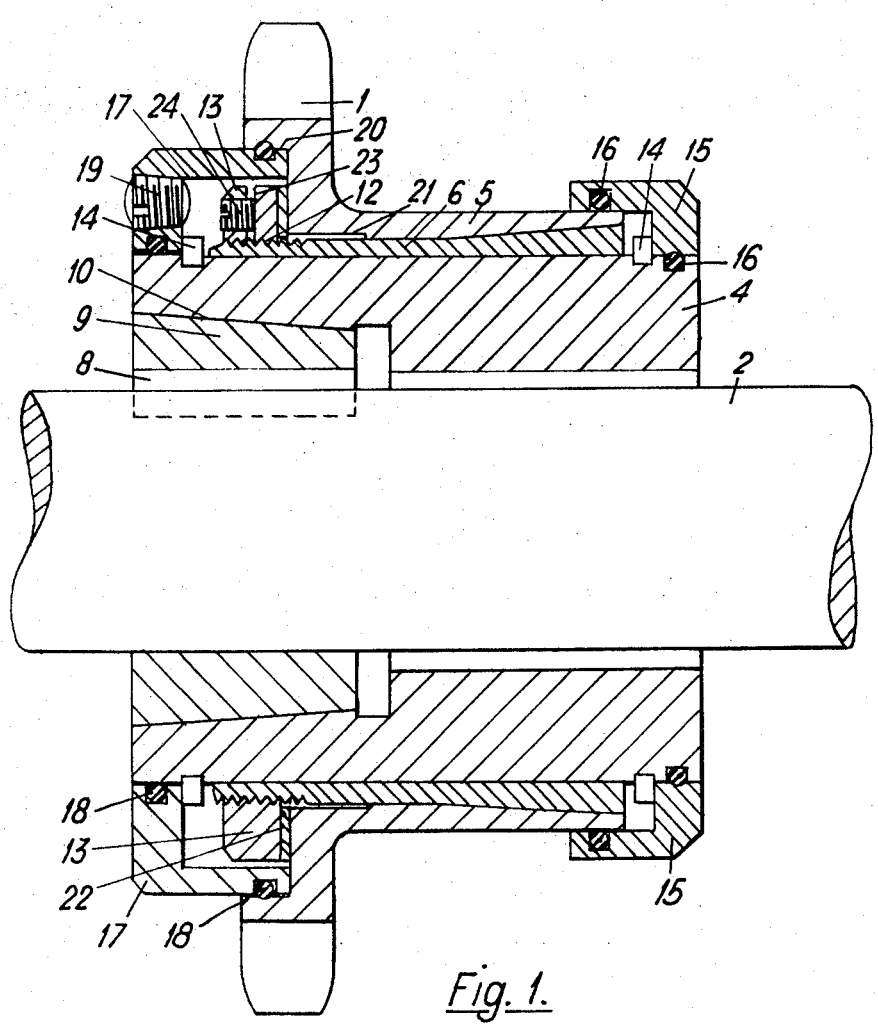

United States Patent [19]
Stiff

[11] 3,751,941
[45] Aug. 14, 1973

[54] TORQUE-LIMITING CLUTCH

[75] Inventor: Rodney Allen Stiff, Bundaberg, Australia

[73] Assignee: Massey-Ferguson (Australia) Limited, Victoria, Australia

[22] Filed: Sept. 20, 1971

[21] Appl. No.: 181,683

[30] Foreign Application Priority Data
Sept. 25, 1970 Great Britain.................. 45,717/70

[52] U.S. Cl................. 64/30 E, 64/30 R, 192/82 T
[51] Int. Cl............................................. F16d 7/02
[58] Field of Search............... 64/30 A, 30 E, 30 D, 64/30 C, 30 R, 28 R; 192/82 T, 65

[56] References Cited
UNITED STATES PATENTS
863,055   8/1907   Diehl.................................. 64/30 A
1,634,942  7/1927  Hillborn............................. 64/30 A
2,763,141  9/1956  Dodge................................ 64/30 R
3,209,993 10/1965  Seifert............................... 64/30 R
3,648,483  3/1972  Garcia................................... 64/30

Primary Examiner—Manuel A. Antonakas
Assistant Examiner—Randall Heald
Attorney—John L. Shortley

[57] ABSTRACT

A torque limiting clutch formed of concentric friction members, upon overload, one member slips relative the other, generating heat causing the elements to expand. The outer clutch member expands more rapidly than the inner resulting in a reduction of the frictional forces between the members and a corresponding reduction in torque.

3 Claims, 6 Drawing Figures

Inventor
RODNEY A. STIFF

Inventor
RODNEY A. STIFF
BY
Gerhardt, Greenlee & Farris
Attorneys

TORQUE-LIMITING CLUTCH

This invention relates to torque-limiting clutches for selectively transmitting rotary motion.

It has been proposed to provide a clutch having a predetermined upper limit to its torque-transmission capacity in order to prevent transmission of excessive torque between two parts of a machine, such clutches will hereinafter and in the appended claims be referred to as "torque-limiting clutches."

Known torque-limiting clutches have the disadvantage that, when said predetermined upper limit on the torque-transmission capacity is exceeded, the clutch slips but the torque transmitted by the clutch is not reduced by a substantial amount. For convenience, hereinafter and in the appended claims said predetermined upper limit on the torque-transmission capacity will be referred to as the "maximum torque."

An object of the present invention is to provide a torque-limiting clutch which transmits a substantially reduced torque when overloaded i. e. when called upon to transmit more than said maximum torque.

According to the invention there is provided a torque-limiting clutch comprising inner and outer friction members, said inner member having a substantially cylindrical outer periphery which is adapted to frictionally engage the inner periphery of said outer member, the latter surrounding the inner member, adjustable means adapted to provide a normal reaction between said members and in which said outer member has a higher rate of thermal expansion than said inner member.

Further, according to the invention, there is provided a clutch comprising an outer annular friction member mounted so as to be free to expand radially outwardly along at least part of its axial length, and an inner friction member arranged to fit within the outer friction member in frictional engagement therewith, torque input means connected to one friction member, and torque output means connected to the other friction member, wherein the coefficients of thermal expansion of the friction members and the thermal capacities and thermal conductivities of the friction members and the components of the clutch to which they can conduct heat are such that the generation of heat between the friction members causes greater thermal expansion of the outer friction member than of the inner friction member.

Figure 2:
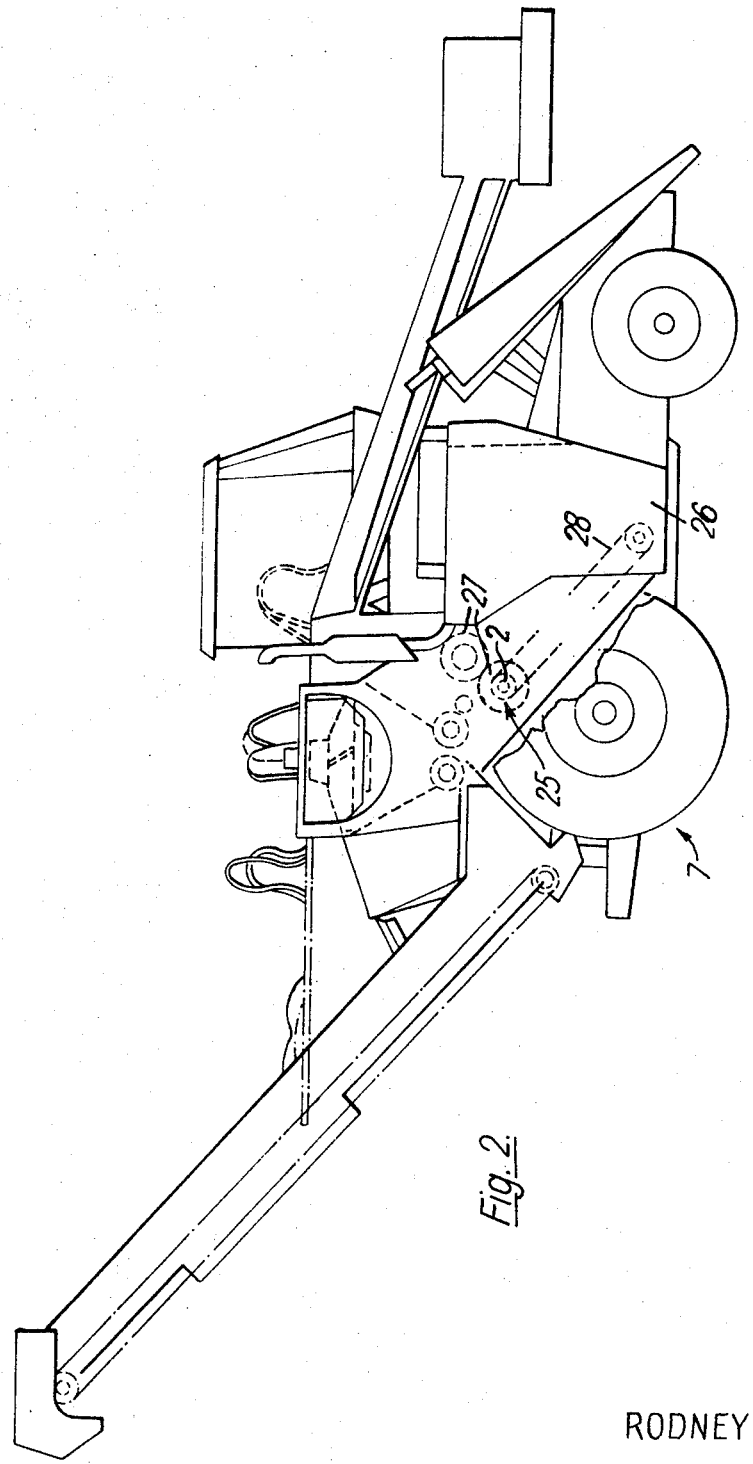
Figure 3:
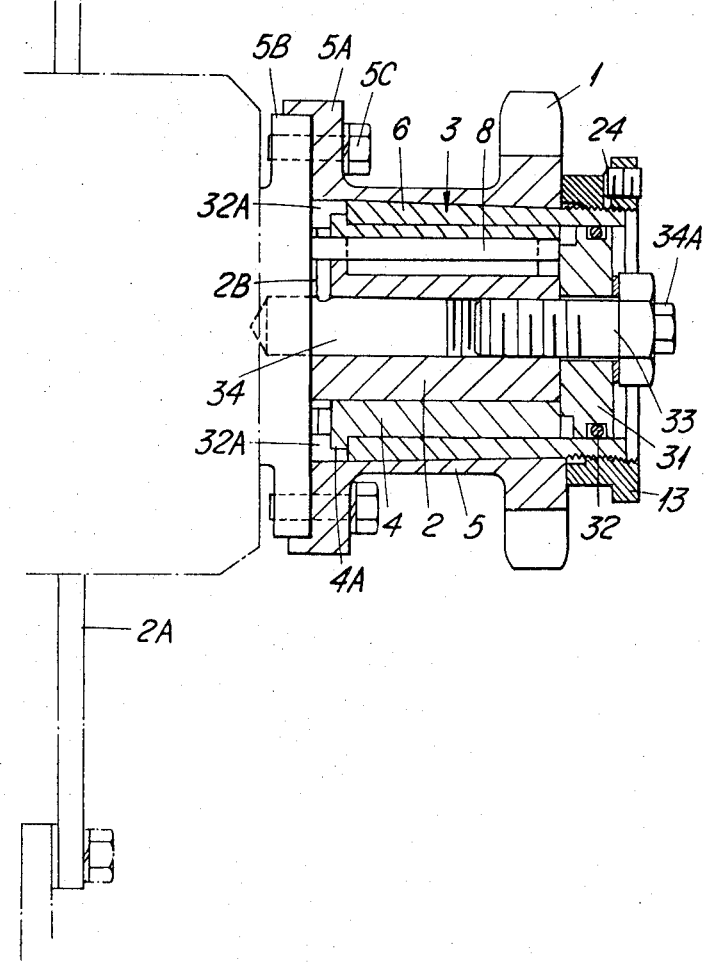
Figure 4:
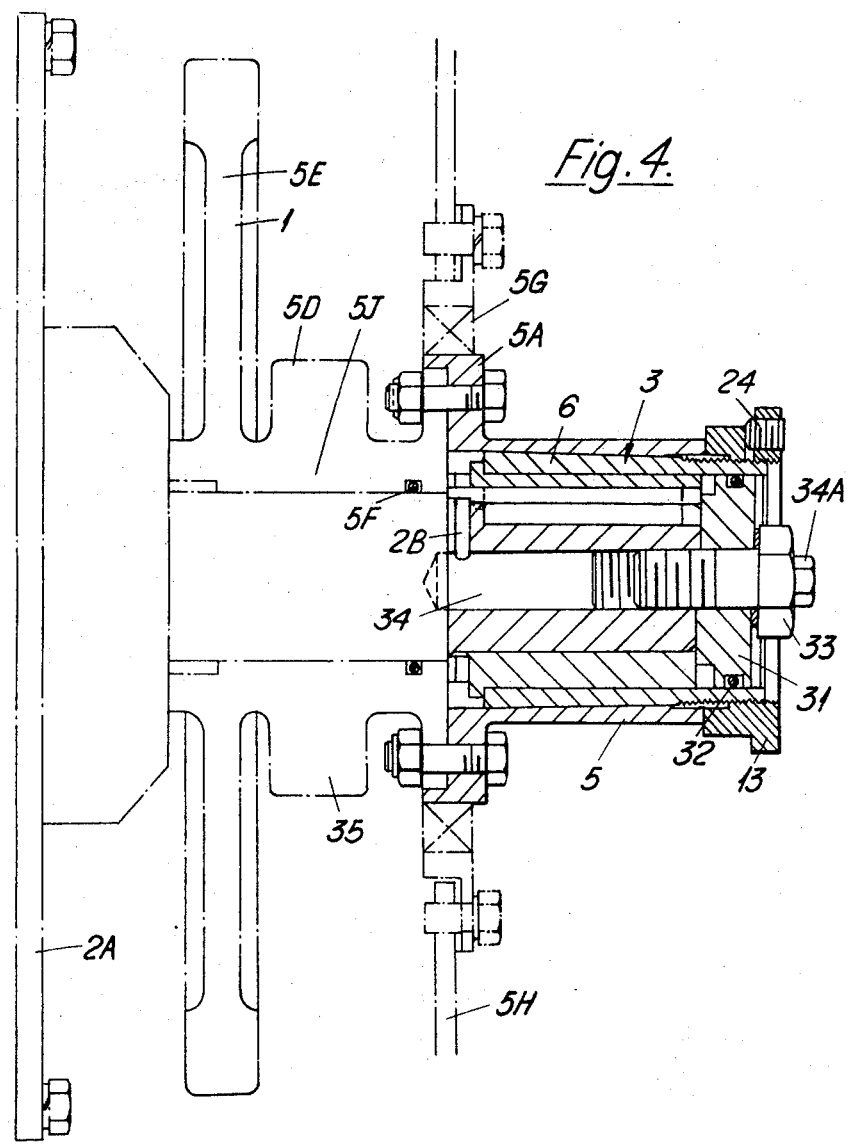
Figure 5:
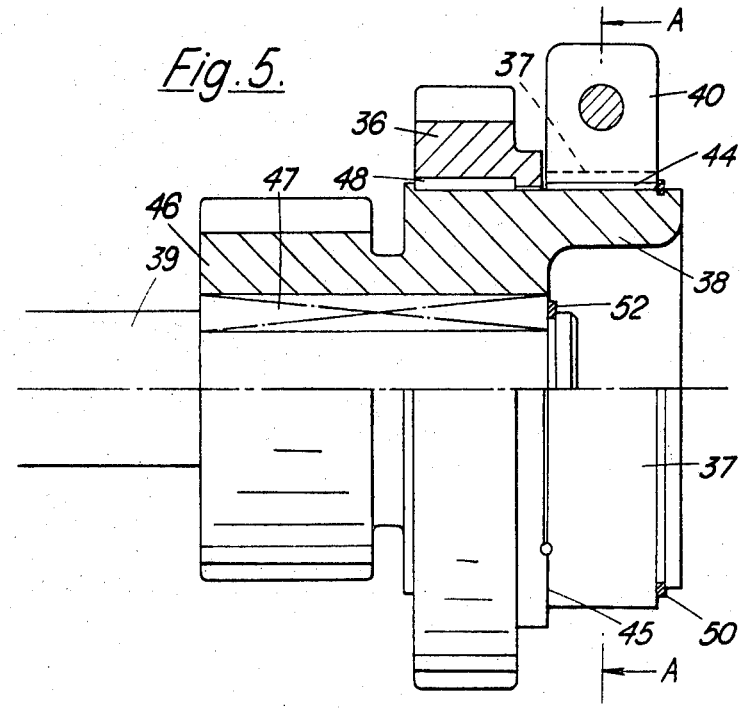
Figure 6:
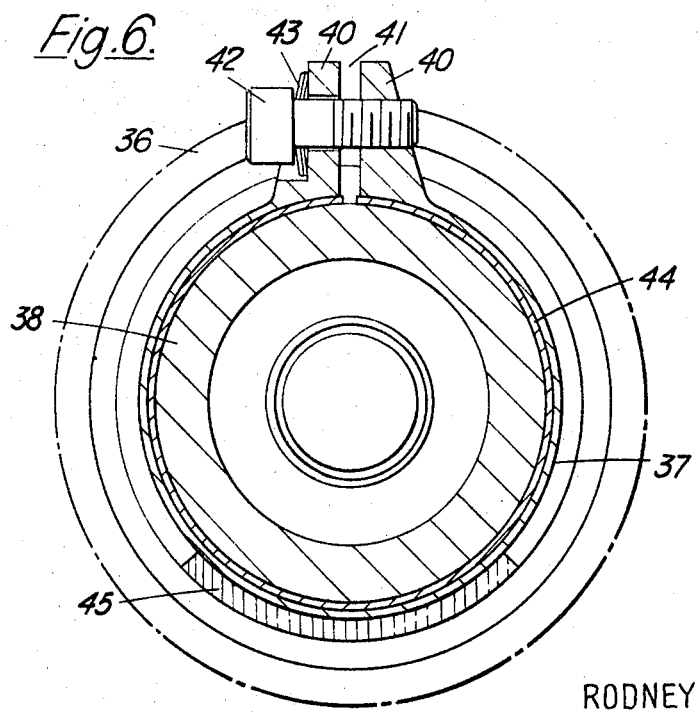

Embodiments of the invention will now be described, by way of example, with reference to the accompanying drawings, in which :

FIG. 1 is a sectional view of a torque-limiting clutch according to the invention mounted on a shaft, the section being taken in the axial direction with respect to the shaft, FIG. 2 is a diagrammatic view of a cane harvester incorporating a clutch as shown in FIG. 1, FIGS. 3 and 4 are sectional views of modifications of the embodiment of the invention shown in FIG. 1, FIG. 5 is a part sectional view of a further embodiment of the invention, and FIG. 6 is a sectional view of the line A—A of FIG. 5.

Referring to FIG. 1 of the drawings, a torque-limiting clutch for transmitting rotary motion from an annular sprocket 1 to a coaxial shaft 2 comprises an outer annular metal friction member 3 and an inner friction member 4 in the form of an annular steel boss secured to the shaft 2 for rotation therewith and arranged to fit within the outer friction member in frictional engagement with the inner surface thereof.

The outer friction member 3 comprises relatively thin outer and inner coaxial tubular members 5 and 6, respectively, having complementary inter-engaging frusto-conical inner and outer surfaces, respectively. The outer tubular member 5 is formed as a tubular steel extension of the radially inner portion of the sprocket 1 and extends axially with respect thereto. The inner tubular member 6 is formed from bronze and has three circumferentially spaces splits (not shown) extending axially from its end remote from sprocket 1 along a major portion of its length. The tubular member 6 is mounted on the external surface of the annular metal boss 4 and is caused to grip the boss by means to be described hereafter. In use, the sprocket 1 is chain-driven and rotary motion is transmitted from the outer tubular member 5 through the inner tubular member 6 to the boss 4 and so to the shaft 2 as will be more fully described hereafter.

The outer friction member 3 is arranged so as to readily lose heat to its surroundings when its temperature rises. This is achieved by arranging the clutch so that the radially outer surface of the outer friction member 3 is freely exposed to the atmosphere so that heat can be rapidly lost from that surface to the air surrounding it.

It has been found that the radial thickness ratio of the inner friction member 4 to the outer friction member 3 is in the range of 3 : 1 to 5 : 1 to obtain best results.

The shaft 2 is connected to the cane chopper drums (not shown) in a sugar cane harvester indicated generally at 7 (FIG. 2). The annular boss 4 is mounted coaxially on the shaft 2 for rotation therewith by means of an axially extending key 8 located in a keyway formed in the outer surface of the shaft 2 and in a bush 9, the latter having a frusto-conical radially outer surface 10 which fits within a corresponding increased diameter portion of the radially inner periphery of the annular boss 4 at the axially outer end thereof. Any other suitable method of securing the boss 4 co-axially on the shaft 2 for rotation therewith may be used instead of that described above.

The radially outer surface of the inner tubular member 6 is formed with a screw thread 12 at its axially outer end, on which is located a thrust nut 13 and an associated washer 22 for engagement with the radially inner portion of the sprocket 1. The nut 13 is divided into two parts over a portion of its circumferential length by a channel 23 which lies in a plane parallel to the plane containing the nut. A grub screw 24, located in an axially-extending screw threaded opening in the axially outer of the said two parts, engages the inner part of the nut. Rotation of the grub screw 24 distorts the nut 13 and releasably locks it in position of the screw thread 12 and any desired position. Rotation of the thrust nut 13 causes relative axial movement of the tubular members 5, 6 and by virtue of their conical interengaging faces produces a wedging action. This wedging action directly increases the frictional grip between the two tubular members. The wedging action also tends to distort the inner tubular member 6 radially inwardly thereby increasing the frictional forces between the inner tubular member 6 and the boss 4. Such distortion is facilitated by the three axially extending splits or divisions (not shown) formed in the inner tubular member 6.

The frusto-conical inner surface of the outer tubular member 5 is formed with a shallow annular channel 21 at its axially outer end so as to accommodate the cylindrical end portion of the inner tubular member 6 on which the screw thread 12 is formed.

A pair of circlips 14, located in annular grooves in the radially outer surface of the boss 4, are provided to limit axial movement of the inner tubular member 6. An annular oil-retaining cover 15 and associated rubber 0-ring seals 16 are provided at the axially inner end of the clutch in sealing engagement with the radially outer surface of the outer tubular member 5 and with the radially outer surface of the boss 4.

At the axially outer end of the clutch a second oil-retaining cover 17, having associated 0-rings 18 and a sealable filler plug 19, is in sealing engagement with a recessed portion 20 of the sprocket 1 and with the radially outer surface of the boss 4. The enclosure defined by the oil-retaining covers 15, 17, the sprocket 1, outer tubular member 5 and the boss 4 is filled with lubricating oil through the filler plug 19.

It is particularly to be noted that the material of both of the tubular member 5, 6 taken together is much thinner, measured in the radial direction, than that of the boss 4. This feature of the construction is adopted in order to ensure that the thermal expansion of the tubular members when heat is generated between the friction members is much greater than that of the boss 4. This difference in thermal expansion arises mainly from the differences in thermal capacity due to the differences in mass, but is of course dependent upon the specific heat, conductivity and coefficient of thermal expansion of each of the materials involved. In the present embodiment, the masses of the components are the most important factor in influencing the relative amounts of expansion.

The embodiment described above is shown at 25 in FIG. 2 transmitting drive from the engine 26 of the cane harvester 7 to the choppers 27 thereof through the intermediary of a chain 28.

In use, the clutch according to th invention operates as follows.

Rotation of the sprocket 1 by the chain 28 normally causes rotation of the cane chopper drive shaft 2 by virtue of the frictional forces between the tubular members 5, 6 and the boss 4. When, for example, the cane choppers 27 driven by the shaft 2 become blocked by an excessive quantity of cane, the torque required to rotate the shaft 2 rises.

However, the torque which can be transmitted from the outer tubular member 5 to the boss 4 is limited by the fictional forces between the friction members 3 and 4. The frictional forces depend on the setting of the rust nut 13. If an attempt is made to transmit a torque greater than the maximum torque, i.e., that which can be transmitted by the said frictional forces, slipping lipping occurs between the friction members, i.e., between the inner tubular member 6 and the boss 4. Slipping occurs between the inner tubular member 6 and the boss 4 and not between the outer and inner tubular members 5, 6 respectively because the diameter of the respective frictionally-engaging surfaces is greater in the latter case than in the former case.

The thrust nut 13 is normally locked in a position such that the maximum torque is slightly less than the torque which, in use of the cane harvester, is needed to stall the engine 26 which drives the sprocket 1.

When the clutch does begin to slip, heat is generated between the outer friction member 3 and the inner friction member 4. This heat is absorbed in roughly equal quantities by the two friction members. Accordingly, by virtue of the differences in mass of the friction members, the outer friction member 3 expands more than the inner friction member, as has been already explained. Such differential expansion sharply reduces the frictional forces between the friction members so that the torque transmitted by the clutch is also sharply reduced.

Since heat generation in the clutch is rapid when slipping occurs, the reduction in torque transmission is also rapid. In practice it has been found that the torque reduces by about 60 percent to 65 percent after slipping has occurred for 3 to 5 seconds.

When the source of the torque overload has been removed and the shaft 2 can be rotated more easily again, the torque transmitted by the clutch is sufficient to rotate the shaft and slipping ceases. This removes the source of heat and the outer friction member 3 loses heat rapidly through the radially outer surface of the outer tubular member 5 and contracts so that the torque which can be transmitted by the clutch returns to normal.

FIGS. 3 and 4 show modifications of the torque-limiting clutch described with reference to FIG. 1, corresponding parts being designed by the same reference numerals. Both the modified clutches operate in the same manner as that described above, but the thrust nut 13 is located externally and oil is retained within the clutch by a sealing pad 31 having an 'O' ring seal 32. The pad 31 is secured to the shaft 2 through a hollow set screw 33 co-axial with the shaft 2. An oil storage cavity is formed in the shaft 2 and can be filled by removal of a filler plug 34A provided in the set screw 33.

In the FIG. 3 modification the drive sprocket 1 is positioned on the tubular member 5 and in the FIG. 4 modification the drive sprocket 1 is positioned on an extension 35 of the tubular member 5.

Referring now to FIGS. 5 and 6, a further embodiment of the invention is shown in which a driven gear or sprocket 36 is connected to an outer friction member 37 which is adapted to frictionally engage the cylindrical outer periphery of an inner friction member 38, the latter being keyed to a driving shaft 39. The outer friction member 37 is in the form of a pipe clamp having a pair of lugs 40 separated by a gap 41. A set screw 42 which is threaded into one of said lugs and the head of which engages the other lug through "Belville" washers 43 is provided to adjust width of the gap 41 thereby varying the normal reaction between the outer and inner friction members 37, 38.

A bronze friction sleeve 44 is provided intermediate the friction members 37 and 38 and the gear 36 is connected to the friction member 37 only through a segmental portion 45 shown hatched in FIG. 6.

In use, the set screw 42 is adjusted so that the clutch slips at the desired maximum torque. When slip begins heat is generated and the outer friction member 37, which as a lower thermal capacity than the inner friction member 38, expands by a greater amount than the inner friction member 38 so that the normal reaction between the friction surfaces is decreased so as to increase the slip. The increase in diameter of the outer friction member 37 is assisted by the gap 41 which widens against the bias of the "Belville" washers 43 when the member is heated.

I claim:

1. A torque-limiting clutch comprising inner and outer friction members, the outer friction member having an annular cross-section and comprising cooperating wedge formations in the form of tapered inner and outer tubular members, the inner tubular member having a higher rate of thermal expansion than the inner friction member, a drive sprocket mounted at one end of the outer tubular member so that the outer friction member has minimum thickness at the zone of frictional engagement with the inner frictional member, said inner friction member having a substantially cylindrical outer periphery which is adapted to be surrounded by and frictionally engage the inner periphery of the inner tubular member of the outer friction member, adjustment means to provide a normal reaction between the inner and outer friction members including screw threads on the inner tubular member and an associated threaded adjustment member with locking means and a face adapted to abut the outer tubular member and oil-retaining covers to connect the ends of the inner and outer friction members.

2. A torque-limiting clutch as claimed in claim 1 in which said inner friction member is connected to a coaxial shaft through a tapered bush keyed to the shaft.

3. A torque-limiting clutch comprising an outer annular friction member mounted so as to be free to expand and an inner friction member arranged to fit within the outer friction member in frictional engagement therewith, adjustment means for adjusting the torque that can be transmitted between the inner and outer friction members without slipage, torque input means connected to one friction member, and torque output means connected to the other friction member, wherein the coefficients of thermal expansion of the friction members and the thermal capacitites and thermal conductivities of the friction members and the components of the clutch to which they can conduct heat are such that the generation of heat between the friction members causes greater thermal expansion of the outer friction member than of the inner friction member, and oil-retaining covers connected to the ends of the inner and outer friction members.

* * * * *